June 5, 1951        K. W. JOHNSON        2,555,341
PARACHUTE RELEASE MECHANISM
Filed Feb. 12, 1947        2 Sheets-Sheet 1
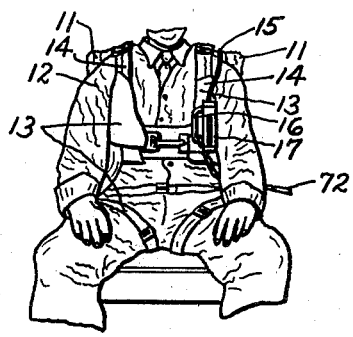
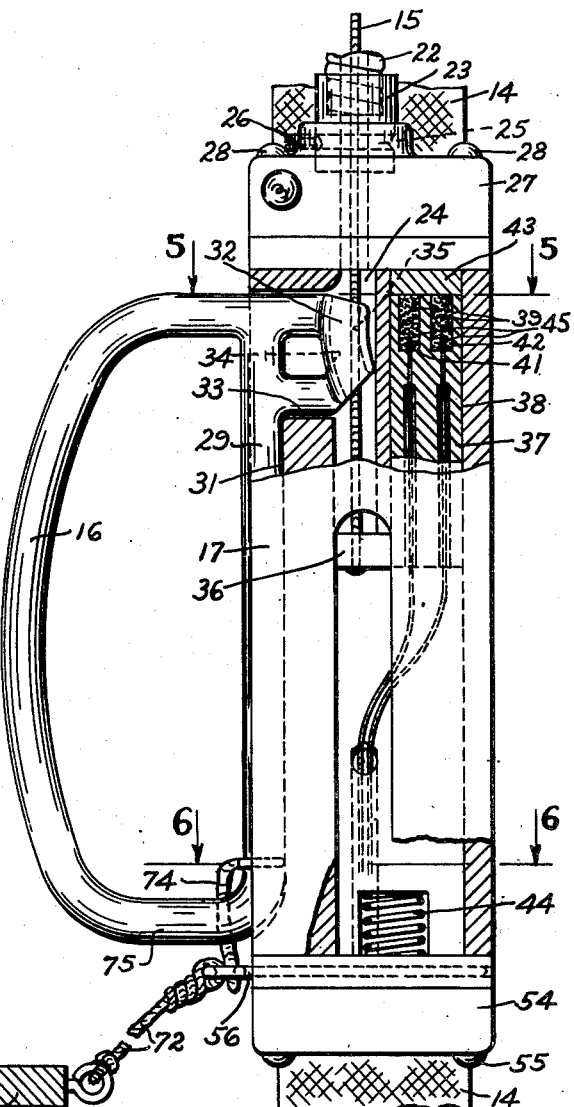
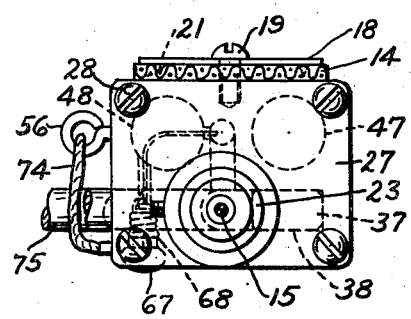
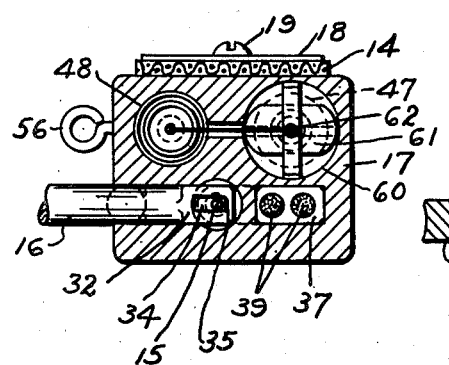
Inventor
Kenneth W. Johnson.
By Walter S. Edwards.
Attorney June 5, 1951 K. W. JOHNSON 2,555,341
PARACHUTE RELEASE MECHANISM
Filed Feb. 12, 1947 2 Sheets-Sheet 2
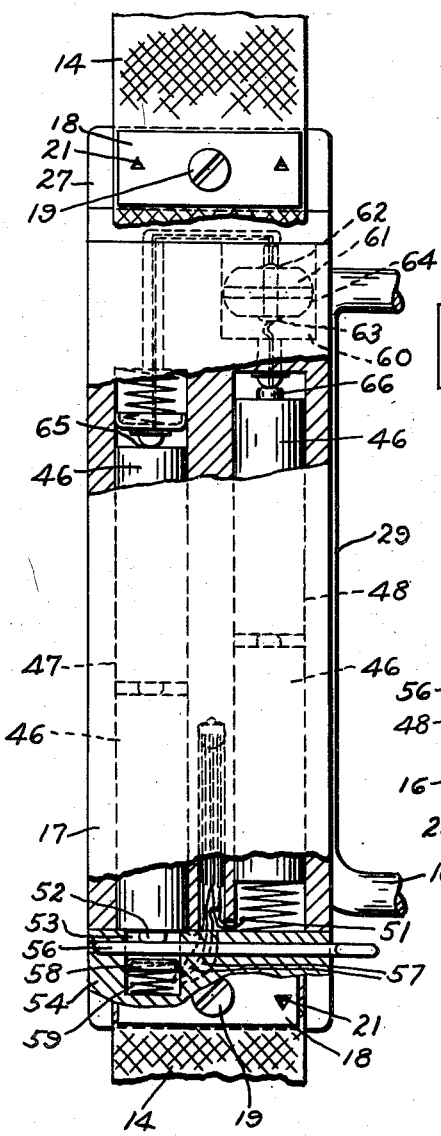
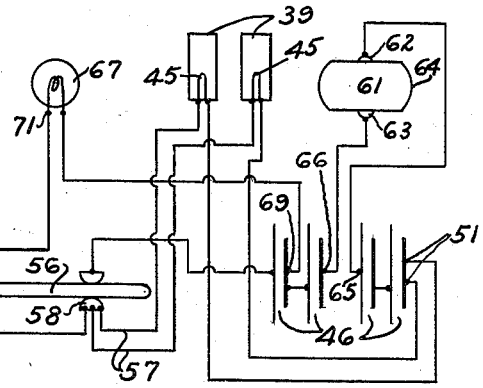
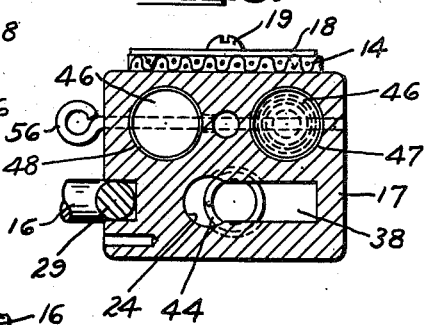
Inventor
Kenneth W. Johnson.
By Walter S. Edwards
Attorney Patented June 5, 1951

2,555,341

UNITED STATES PATENT OFFICE 2,555,341

PARACHUTE RELEASE MECHANISM

Kenneth W. Johnson, Bethany, Conn., assignor of one-half to Adeline Gray Johnson, South Britain, Conn.

Application February 12, 1947, Serial No. 728,115

5 Claims. (Cl. 244—150)

This invention relates to release mechanisms for parachutes, and especially for parachutes having a releasing rip cord in their structure. This invention relates more particularly to a mechanism which may be manually operated, or set for full automatic operation, as desired, and it is especially useful on parachutes used in cases of emergency, in the delivery of freight and for use by persons who are unconscious or partially disabled.

One object of this invention is to provide an improved parachute release mechanism.

Another object is to provide means in such a mechanism whereby it is adapted to actuate a parachute releasing rip cord manually or automatically.

Still another object is to provide a parachute release mechanism with actuating means which is automatically operable after a person, or object, has cleared the plane and tumbles through space.

Further objects are to provide in such mechanism means to set the automatically operable means before leaving the plane either manually, or automatically and to provide a signal indicating that the mechanism is set for automatic operation.

A still further object of this invention is to provide a parachute release mechanism which will be relatively inexpensive to manufacture, simple in construction, compact, light in weight, ornamental in appearance, and very practical, efficient and durable in use.

With these and other objects in view, which will appear as the description proceeds, there has been illustrated in the accompanying drawings one form of mechanism in which the features and principles of this invention may be conveniently embodied in practice.

In the drawings:

Figure 1 is a view of a person having a parachute attached thereto and with the parachute release mechanism of this invention operably associated therewith;

Figure 2 is a front view of a parachute release mechanism embodying the features and principles of this invention and which is partly in section to disclose certain internally disposed elements thereof;

Figure 3 is a rear view of the mechanism shown in Figure 2 and which is also partly in section to disclose internally disposed elements;

Figure 4 is a top plan view of the same;

Figure 5 is a cross-sectional view taken on the line 5—5 of Figure 2;

Figure 6 is a cross-sectional view taken on the line 6—6 of Figure 2; and

Figure 7 is a diagrammatic view of the electrical circuits connecting the elements of the mechanism.

Referring now to the drawings wherein like reference numerals designate like parts throughout the several views, the numeral 11 denotes a packed parachute attached to a person 12 by means of the usual harness 13 which harness includes straps 14 usually made of heavy fabric. The parachute 11 is provided with the usual parachute releasing rip cord 15 whereby the parachute is released from the pack when the rip cord 15 is abruptly pulled by manual manipulation of a handle 16 by the person wearing the parachute.

The operating elements of the mechanism illustrated are all housed in a casing 17 which is shown conveniently disposed upon a harness side strap 14. The casing 17 is secured to the strap 14 by clamp plates 18 and screws 19, the plates 18 having prongs 21, which protrude into the strap 14, and the screws 19 passing through the plates 18 and strap 14 and screw threaded into the casing 17. The rip cord 15 is usually contained in a flexible metallic casing 22 which, in this instance, is secured to the casing 17 at the top in a bushing 23, the rip cord 15 extending beyond the bushing 23 and into an opening 24 extending lengthwise through the casing 17. The bushing 23 is rotatably secured to the casing 17 by means of an annular groove 25 formed in the periphery of the bushing and a set screw 26 screw threaded through the casing and seated in said groove 25. In this instance the bushing 23 is shown secured to a top cover block 27 secured upon the casing 17 by screws 28.

The operating handle 16 is provided with a base bar 29 which seats in a lengthwise groove 31 formed in one side of the casing 17 and has an inwardly projecting tongue 32. The tongue 32 is adapted to extend through laterally extending opening 33 in the casing 17 and into the rip cord opening 24. At its inner end the tongue 32 is provided with an opening 34 through which the rip cord 15 passes. The inner wall 35 of the opening 34 is arcuate to reduce wear upon the rip cord 15 when the handle is manually manipulated to pull the cord.

The end of the rip cord 15 is secured to an arm 36 extending from a piston 37 into the rip cord opening 24. The piston 37, in this instance, is rectangular in cross-section, and is adapted to slide in an opening 38 formed in and extending lengthwise in the casing 17. Downward movement of the piston 37 through the connection of the arm 36 with the rip cord 15 will pull upon the rip cord to release the parachute from its pack.

The action of the piston 37 upon the rip cord 15 is automatic after the mechanism is set for such operation. Pressure applying means is used to actuate the piston 37 and comprises, in this instance, an explosive mixture, or charge, 39, one disposed in each of separated pockets 41 and 42 formed in the upper end of the piston 37. The ignition and explosive of either, or both, of the explosive charges 39 will act on the piston 37 to force it downwardly to pull upon the rip cord 15. A removable and replaceable plug 43 is disposed in the upper end of the piston opening 38 to seal it and abuts against the top cover block 27. A coiled spring 44 is disposed in the casing 17 at the bottom of the openings 24 and 38 to act as a shock resisting bumper for the arm 36 and piston 37.

The explosive charges 39 are ignited by means comprising, in this instance, loops of resistance wire, or filaments, 45, adapted to become heated and to glow when energized by a flow of electricity therethrough. The electrical energy for so energizing the filaments 45 is obtained from a battery of dry cells 46, four being shown, in this instance, connected in series. The cells 46 are disposed two in each of openings 47 and 48 extending lengthwise in the casing 17. One terminal 49 of the battery of dry cells 46 is connected to a contact, one terminal 51 of each of the filaments 45 and the other terminal 52 of one cell 46 of the battery extends into an opening 53 formed in a bottom cover block 54, secured to the lower end of the casing 17 by screws 55, and rest upon a safety pin 56 of insulating material.

The other terminals 57, of each of the filaments 45, are connected to a terminal disc 58 disposed in the openings 53 and constantly forced upwardly against the safety pin 56 by a spring 59. The terminal disc 58 is in alignment with the battery cell terminal 52 and therefore upon removal of the safety pin 56 these terminals will contact to close the circuit at this point. The circuit through the cells 46 is interrupted, in this instance, by a movement controlled switch 61, such as a form of the well-known mercury switches, by which a circuit is closed between its terminals 62 and 63 upon movement of the switch housing 64 in any direction. One of the terminals 62 of the switch 61 is connected to the terminal 65 of one of the intermediate cells 46 of the battery and the other terminal 63 of the switch 61 is connected to the terminal 66 of another of the cells 46 of the battery. Closure of the circuit by the switch 61 by the movement of the switch housing 64 due to the person wearing the parachute tumbling in the air after leaving the plane, or of an article of freight tumbling when thrown from the plane, will cause the explosive charges 39 to ignite and thus actuate the rip cord 15 to release the parachute, provided the safety pin 56 has been removed to close the circuit between the terminals 52 and 58. The switch 61, in this instance, is held in a bore 60 provided in the casing 17 directly above the elongated opening 48.

To indicate that the safety pin 56 has been withdrawn and that improper handling of the parachute pack will cause ignition of the explosive charges 39 indicating means is provided. The indicating means herein disclosed comprises an electric light bulb 67 suitably seated in an opening 68 provided in the top cover block 27. One terminal of the light bulb 67 is connected to the terminal 69 of one of the cells 46 and the other terminal 71 of the bulb 67 is connected to the disc terminal 58 whereby the light bulb 67 will be energized to glow and thus indicate that the safety pin 56 has been removed.

The safety pin 56 may be removed to set the mechanism for automatic operation by hand before the person, or freight, tumbles, or is thrown, from the plane. Provision of means is herein shown whereby the safety pin 56 is withdrawn to set the mechanism for automatic operation should the person, or article, inadvertently fall from the plane. This means comprises a so-called life line 72, or cable, one end of which is attached to the safety pin 56 and adapted to have its other end attached to some part of the plane 73. A short length of cable 74 may also be looped over the lower member 75 of the handle 16 with one end fastened to the casing 17 and its other end fastened to the pin 56 whereby manual actuation of the handle 16 to pull on the rip cord 15 will set the mechanism for automatic operation thus insuring release of the parachute should the manual pull upon the handle be ineffective in this respect.

While there has been shown and described herein one form in which the features and principles of this invention may be embodied in practice, it is to be understood that the same may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully disclosed the invention, what is claimed as new and for which it is desired to secure Letters Patent, is:

1. In a parachute release mechanism, a casing adapted to receive the rip cord of a parachute, a member slidably mounted in said casing and adapted to be secured to the rip cord therein to actuate it to release the parachute when moved in one direction in said casing, an explosive mixture adapted to act on said member to move it in rip cord actuating direction, means to ignite said explosive mixture, said mixture igniting means including a member adapted to be electrically energized, a source of electrical energy carried by said casing, a switch mechanism operable when the casing is tumbled out of its normal position to connect the source of electrical energy to said last mentioned member to energize it, safety means positioned in said casing to maintain open the electrical circuit connecting the source of electrical energy and the last mentioned member and being movable to close the said circuit, and a signal light operable by movement of said safety means into circuit closing position.

2. In a parachute release mechanism, a casing having a first opening from one end lengthwise thereof to receive the rip cord of a parachute, a rip cord operating handle having a part extending through one side of said casing and adapted to operably engage a rip cord disposed therein, said casing having a second lengthwise extending opening, a member slidable in the second opening, means extending from one opening to the other and connecting said member with a rip cord in the first opening, an explosive mixture disposed in the second opening in position to act on said member to slide it in rip cord actuating direction, and means to automatically explode said mixture.

3. In a parachute release mechanism, a casing having a first opening from one end lengthwise thereof to receive the rip cord of a parachute, a rip cord operating handle having a part extending through one side of said casing into the aforesaid first opening and adapted to be operably connected to a rip cord disposed therein, said casing having a second opening extending lengthwise therein, a member in the second opening and slidable lengthwise therein, a part of said member extending into the first opening and connectible to a rip cord therein, an explosive mixture disposed in the second opening of said casing in position to act on said member to move it in rip cord operating direction, electrically energized means in said casing to ignite said explosive mixture, and a gravity operated switch in said casing to close an electrical circuit to energize said igniting means.

4. In a parachute release mechanism, a casing having a first opening from one end lengthwise thereof to receive the rip cord of a parachute, a rip cord operating handle having a part extending through one side of said casing, into the aforesaid first opening and adapted to be operably connected to a rip cord disposed therein, said casing having a second opening extending lengthwise therein, a member in the second opening and slidable lengthwise therein, a part of said member extending into the first opening and connectible to a rip cord therein, an explosive mixture disposed in the second opening of said casing in position to act on an end of said member to move the member in rip cord operating direction, means to ignite said mixture, a source of electrical energy in said casing, a circuit in said casing connecting said source of electrical energy to said igniting means, and a gravity actuated switch mounted in the casing and in said electrical circuit.

5. In a parachute release mechanism, a casing having a first opening from one end lengthwise thereof to receive the rip cord of a parachute, a rip cord operation handle having a part extending through one side of said casing into the aforesaid first opening and adapted to be operably connected to a rip cord disposed therein, said casing having a second opening extending lengthwise therein, a member in the second opening and slidable lengthwise therein, a part of said member extending into the first opening and connectible to a rip cord therein, an explosive mixture disposed in the second opening of said casing in position to act on said member to move it in rip cord operating direction electrically energized means in said casing to ignite said explosive mixture, and a gravity operated switch in said casing to close an electrical circuit to energize said igniting means, means in said casing normally holding said electrical circuit in closed condition, and removable means adapted to be disposed in said casing to hold said last mentioned means in position to maintain said circuit in open position.

KENNETH W. JOHNSON.

REFERENCES CITED

The following references are of record in the file of this patent:

UNITED STATES PATENTS

| Number | Name | Date |
| --- | --- | --- |
| 1,709,264 | Holt | Apr. 16, 1929 |
| 1,944,795 | Lafayette | Jan. 23, 1934 |
| 2,175,634 | McQuillen | Oct. 10, 1939 |
| 2,353,440 | Bresee | July 11, 1944 |
| 2,365,445 | Badowski | Dec. 19, 1944 |
| 2,504,148 | Ogden et al. | Apr. 18, 1950 |

FOREIGN PATENTS

| Number | Country | Date |
| --- | --- | --- |
| 585,265 | Great Britain | Feb. 3, 1947 |